(12) United States Patent
Jeon et al.

(10) Patent No.: US 10,559,852 B2
(45) Date of Patent: Feb. 11, 2020

(54) ELECTROLYTE SOLUTION FOR LITHIUM SECONDARY BATTERY AND LITHIUM SECONDARY BATTERY HAVING SAME

(71) Applicant: Samsung SDI Co., Ltd., Yongin-si, Gyeonggi-do (KR)

(72) Inventors: Jong Ho Jeon, Daejeon (KR); Joo Hwan Koh, Seoul (KR); Jin Ah Seo, Cheongju-si (KR); Jin Hee Kim, Suwon-si (KR); Sung Nim Jo, Seoul (KR); Tae Hwan Yu, Seoul (KR); Jung Joo Cho, Hwaseong-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 229 days.

(21) Appl. No.: 15/538,945

(22) PCT Filed: Jun. 30, 2015

(86) PCT No.: PCT/KR2015/006687
§ 371 (c)(1),
(2) Date: Jun. 22, 2017

(87) PCT Pub. No.: WO2016/104895
PCT Pub. Date: Jun. 30, 2016

(65) Prior Publication Data
US 2018/0026307 A1    Jan. 25, 2018

(30) Foreign Application Priority Data
Dec. 22, 2014  (KR) .................... 10-2014-0185905

(51) Int. Cl.
*H01M 10/0568*    (2010.01)
*H01M 10/0569*    (2010.01)
(Continued)

(52) U.S. Cl.
CPC ... *H01M 10/0568* (2013.01); *H01M 10/0525* (2013.01); *H01M 10/0569* (2013.01); *H01M 2300/0025* (2013.01)

(58) Field of Classification Search
CPC .... H01M 6/16; H01M 6/162; H01M 10/0568; H01M 10/0569; H01M 10/0525
See application file for complete search history.

(56) References Cited

U.S. PATENT DOCUMENTS

| 8,835,667 B2 | 9/2014 | Shinohara et al. |
| 2004/0002002 A1* | 1/2004 | Mizuta ................... H01G 9/035 |
| | | 429/188 |

(Continued)

FOREIGN PATENT DOCUMENTS

| CN | 102712659 A | 10/2012 |
| CN | 103140963 A | 6/2013 |

(Continued)

OTHER PUBLICATIONS

EPO Extended Search Report dated Jun. 12, 2018, for corresponding European Patent Application No. 15873423.6 (7 pages).

(Continued)

*Primary Examiner* — Kenneth J Douyette
(74) *Attorney, Agent, or Firm* — Lewis Roca Rothgerber Christie LLP

(57) ABSTRACT

Provided is an electrolyte solution for a lithium secondary battery and a lithium secondary battery having the same, the electrolyte solution further including an expressed solid salt which has an ammonium-based cation and a cyanide anion ($CN^-$). According to an embodiment of the present invention, an electrolyte solution including the solid salt may be provided, and thus the problem of decrease in stability of a negative electrode due to copper ions that are dissolved from a copper current collector in a high-temperature environment may be resolved. Therefore, a lithium secondary (Continued)

battery having excellent battery performance such as battery capacity, charging and discharging efficiency, and cycle characteristics even under a high-temperature condition may be provided.

7 Claims, 1 Drawing Sheet

(51) Int. Cl.
*H01M 10/0525* (2010.01)
*H01M 4/34* (2006.01)

(56) References Cited

U.S. PATENT DOCUMENTS

| | | |
|---|---|---|
| 2008/0254370 A1 | 10/2008 | Lee et al. |
| 2011/0150736 A1* | 6/2011 | Hagiwara ............ C07D 233/58 423/276 |
| 2012/0082872 A1 | 4/2012 | Schmidt et al. |
| 2012/0082901 A1 | 4/2012 | Schmidt et al. |
| 2013/0323571 A1 | 12/2013 | Dai et al. |

FOREIGN PATENT DOCUMENTS

| | | |
|---|---|---|
| CN | 103201891 A | 7/2013 |
| JP | 2005-63764 A | 3/2005 |
| JP | 2012-216419 A | 11/2012 |
| KR | 10-2006-0063749 A | 6/2006 |
| KR | 10-2011-0025661 A | 3/2011 |
| KR | 10-1225893 B1 | 1/2013 |
| KR | 10-1297786 B1 | 8/2013 |
| KR | 10-2013-0119431 A | 10/2013 |
| KR | 10-2014-0000235 A | 1/2014 |

OTHER PUBLICATIONS

Chinese Office Action with English Translation for corresponding Chinese Application No. 201580076756.7, dated Jan. 4, 2019, 10 pages.

* cited by examiner

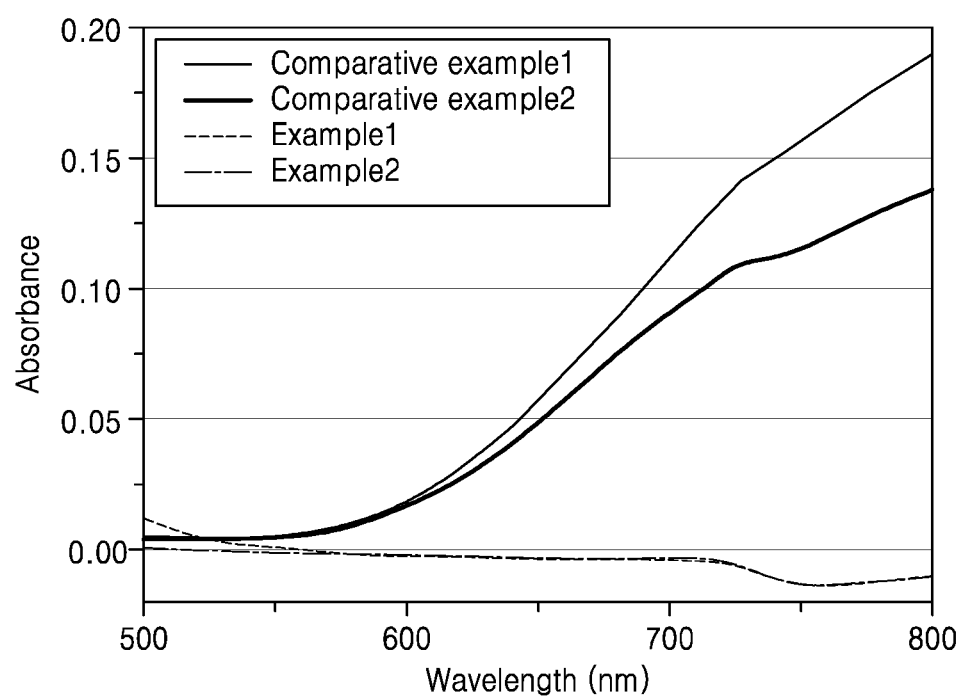

ELECTROLYTE SOLUTION FOR LITHIUM SECONDARY BATTERY AND LITHIUM SECONDARY BATTERY HAVING SAME

CROSS-REFERENCE TO RELATED APPLICATION(S)

This application is a National Phase Patent Application of International Patent Application Number PCT/KR2015/006687, filed on Jun. 30, 2015, which claims priority of Korean Patent Application 10-2014-0185905, filed Dec. 22, 2014. The entire contents of both of which are incorporated herein by reference.

TECHNICAL FIELD

One or more embodiments relate to an electrolyte solution for a lithium secondary battery and a lithium secondary battery having the same, and, more particularly, to an electrolyte solution for a lithium secondary battery and a lithium secondary battery having the same that are capable of suppressing decrease in stability of a negative electrode in a high-temperature environment by including a solid salt, which has an ammonium-based cation and a cyanide anion ($CN^-$), as an electrolyte solution additive.

BACKGROUND ART

According to technological development and increased demand for mobile devices, demand for using secondary batteries as energy sources has rapidly increased. Among such secondary batteries, lithium secondary batteries having high energy density and operating potential, long cycle life, and low self-discharge rate are commercially available and widely used.

A lithium secondary battery has a structure in which an electrode assembly including a positive electrode, a negative electrode, and a porous separator disposed between the positive electrode and the negative electrode is impregnated in an electrolyte solution including a lithium salt, wherein the positive electrode and the negative electrode are each prepared by applying an active material on an electrode current collector. During a charging process, lithium ions of a positive active material are dissolved and inserted into an active material layer of the negative electrode. During a discharge process, lithium ions in the active material layer are dissolved and inserted into the positive active material. The electrolyte solution serves as a medium that transfers lithium ions between the negative electrode and the positive electrode.

The electrolyte solution generally includes an organic solvent and an electrolyte salt. For example, the electrolyte solution may be prepared by adding a lithium salt, such as $LiPF_6$, $LiBF_4$, or $LiClO_4$, in a solvent mixture including high-dielectric cyclic carbonate, such as propylene carbonate or ethylene carbonate; and low-viscosity chain carbonate, such as diethyl carbonate, ethyl methyl carbonate, or dimethyl carbonate.

However, when a copper foil is used as a negative electrode current collector, the problem of copper ions ($Cu^{2+}$) being dissolved from a copper current collector into an electrolyte solution occurred in cases of overdischarging the lithium secondary battery or exposing the lithium secondary battery to a high-temperature environment, and this became a cause for deteriorating stability of the negative electrode.

Particularly, when the lithium secondary battery is overdischarged such that a voltage of the battery becomes 0 V, a voltage of a side of the negative electrode having a large irreversible capacity first increases, and when the voltage of a side of the negative electrode reaches a predetermined voltage region of about 3.6 V or higher, where the copper foil oxidizes, copper ions are dissolved from the copper foil into the electrolyte solution.

The dissolved copper ions precipitate back to a metal on a surface of the negative electrode during a charging process and thus deteriorate stability of the negative electrode. For example, precipitated copper may generate a fine short circuit on the surface of the negative electrode or may disturb intercalation of lithium ions and thus may decrease a charging and discharging capacity.

As a method to resolve these problems, Patent Document 1 (KR 2006-0063749) discloses an electrolyte solution for a lithium secondary battery, the electrolyte solution including a multi-component metal oxide salt represented by Formula $A_xM_yO_z$ (where, A is at least one element selected from the group consisting of alkali metals and alkaline earth metals, M is at least one element selected from the group consisting of nonmetals, semimetals, and transition metals, $1 \leq x \leq 6$, $1 \leq y \leq 7$, and $2 \leq z \leq 24$), e.g., a metal oxide salt such as $Li_2MoO_4$, $Li_2WO_4$, as an additive. However, when this method is used, although an oxidation initiating voltage increases a little, the problem of dissolution of copper ions occurring when the lithium secondary battery is left at a high temperature could not have been resolved.

In addition to the method of adding a new material to an electrolyte solution, a method of chaining elements such as an electrode plate or a separator may be used. For example, Patent Document 2 (JP 2005-063764) discloses a method of preventing dissolution of copper during an overdischarge process by providing a copper foil for a lithium ion secondary battery, wherein a chrome-based thin layer is formed on a surface of the copper foil. However, a process of the method is complicated, and the method is not efficient in terms of cost, compared to those of the method of adding an additive to an electrolyte.

PRIOR ART

Patent Document (Patent Document 1) KR 2006-0063749 A
(Patent Document 2) JP 2005-063764 A

DETAILED DESCRIPTION OF THE INVENTION

Technical Problem

According to an embodiment, provided is an electrolyte solution for a lithium secondary battery that is capable of resolving the problem of decrease in stability of a negative electrode due to copper ions ($Cu^{2+}$) that are dissolved from a copper current collector in a high-temperature environment.

According to another embodiment, provided is a lithium secondary battery having excellent battery performance such as battery capacity, charging and discharging efficiency, and cycle characteristics even under a high-temperature condition by including the electrolyte solution.

Technical Solution

According to an embodiment, provided is an electrolyte solution for a lithium secondary battery, wherein the electrolyte solution includes a lithium salt and an organic solvent, and the electrolyte solution further includes a solid salt that is represented by Formula 1 and has an ammonium-based cation and a cyanide anion (CN$^-$).

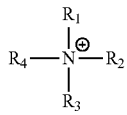

[Formula 1]

In Formula 1, $R_1$ to $R_4$ are each independently hydrogen, halogen, or a $C_1$-$C_8$ alkyl group.

In some embodiments, an amount of the solid salt may be in a range of 0.01 part to 5.0 parts by weight based on 100 parts by weight as the total weight of the lithium salt and the organic solvent.

The solid salt represented by Formula 1, according to an embodiment, may be at least one selected from the group consisting of ammonium cyanide, tetramethylammonium cyanide, tetraethylammonium cyanide, tetrapropylammonium cyanide, tetrabutylammonium cyanide, tetrahexylammonium cyanide, tetraheptylammonium cyanide, ethyltrimethylammonium cyanide, triethylmethylammonium cyanide, butyltrimethylammonium cyanide, diethyldimethylammonium cyanide, and dibutyldimethylammonium cyanide.

According to another embodiment, provided is a lithium secondary battery including the electrolyte solution.

Advantageous Effects of the Invention

According to one or more embodiments, the problem of decrease in stability of a negative electrode due to copper ions dissolving from a copper current collector in a high-temperature environment may be resolved by providing an electrolyte solution for a lithium secondary battery, wherein a solid salt having an ammonium-based cation and a cyanide anion (CN$^-$) is included in the electrolyte as an additive.

In this regard, the stability of the negative electrode may be secured, and thus the lithium secondary battery having excellent battery performance such as battery capacity, charging and discharging efficiency, and cycle characteristics even under a high-temperature condition may be provided.

DESCRIPTION OF THE DRAWINGS

FIG. 1 is a graph that compares UV-VIS curves of each of the electrolyte solutions prepared in Examples 1 and 2 and Comparative Examples 1 and 2 after leaving a negative electrode in the electrolyte solutions at 45° C. for 24 hours.

BEST MODE

According to an embodiment, provided is an electrolyte solution for a lithium secondary battery, the electrolyte solution including a lithium salt and an organic solvent, wherein the electrolyte solution further includes a solid salt that is represented by Formula 1 and has an ammonium-based cation and a cyanide anion (CN$^-$).

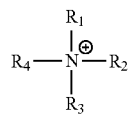

[Formula 1]

In Formula 1, $R_1$ to $R_4$ are each independently hydrogen, halogen, or a $C_1$-$C_8$ alkyl group.

The solid salt and the copper ions (Cu$^{2+}$) dissolved in the electrolyte solution may form a complex, and thus the copper ions may be prevented from being precipitated back to a metal on a surface of the negative electrode during a charging process. Such method of adding a new material to an electrolyte solution is appropriate since it is simple and economical as battery plates and a separator as conventionally used do not need to be replaced and may reduce the problem caused by dissolution of copper ions.

An amount of the solid salt may preferably be in a range of 0.01 parts to 5.0 parts by weight based on 100 parts by weight as the total weight of the lithium salt and the organic solvent, and more preferably, in a range of 0.1 parts to 1.0 parts by weight. When the amount is less than 0.01 parts by weight, the effect of resolving the problem caused by copper ions dissolved from the negative electrode current collector may be insignificant, whereas, when the amount is greater than 5.0 parts by weight, the high-temperature lifespan may significantly deteriorate while performing high-temperature charging and discharging cycles.

Examples of the solid salt according to an embodiment may include at least one selected from ammonium cyanide, tetramethylammonium cyanide, tetraethylammonium cyanide, tetrapropylammonium cyanide, tetrabutylammonium cyanide, tetrahexylammonium cyanide, tetraheptylammonium cyanide, ethyltrimethylammonium cyanide, triethylmethylammonium cyanide, butyltrimethylammonium cyanide, diethyldimethylammonium cyanide, and dibutyldimethylammonium cyanide, but embodiments are not limited thereto.

The lithium salt included in the electrolyte solution according to an embodiment may be used at a concentration in a range of 0.6 M to 2.0 M, or, preferably, in a range of 0.7 M to 1.6 M. When the concentration of the lithium salt is lower than 0.6 M, the conductivity of the electrolyte solution may decrease, and thus electrolyte solution performance may deteriorate. On the other hand, when the concentration of the lithium salt is higher than 2.0 M, the viscosity of the electrolyte solution increases, which may result in decrease in mobility of lithium ions. The lithium salt may be any lithium salt that is generally used in an electrolyte solution for a lithium secondary battery, and examples of an anion of the lithium salt may be at least one selected form the group consisting of F$^-$, Cl$^-$, Br$^-$, I$^-$, NO$_3^-$, N(CN)$_2^-$, BF$_4^-$, ClO$_4^-$, PF$_6^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, CF$_3$CF$_2$SO$_3^-$, (CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, (SF$_5$)$_3$C$^-$, (CF$_3$SO$_2$)$_3$C$^-$, CF$_3$(CF$_2$)$_7$SO$_3^-$, CF$_3$CO$_2^-$, CH$_3$CO$_2^-$, SCN$^-$, and (CF$_3$CF$_2$SO$_2$)$_2$N$^-$.

The organic solvent included in the electrolyte solution may be any organic solvent generally used in an electrolyte solution for a lithium secondary battery, and examples of the organic solvent may include ether, ester, amide, linear carbonate, and cyclic carbonate that may be used alone or as a mixture of at least two selected therefrom.

The organic solvent may include cyclic carbonate, linear carbonate, or a carbonate compound as a mixture of cyclic carbonate and linear carbonate among these examples. Examples of the cyclic carbonate compound may be one or a mixture of at least two selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and halides thereof. Also, examples of the linear carbonate compound may include one or a mixture of at least two selected from the group consisting of dimethyl carbonate (DMC), diethyl carbonate (DEC), dipropyl carbonate, ethyl methyl carbonate (EMC), methyl propyl carbonate, and ethylpropyl carbonate, but embodiments are not limited thereto.

In particular, EC and PC, which are cyclic carbonates among examples of the carbonate-based organic solvent, are organic solvents having a high viscosity and a high dielectric constant. Therefore, EC and PC easily dissociate a lithium salt in an electrolyte and thus may preferably be used. When low-viscosity and low-dielectric constant linear carbonates such as DMC and DEC are mixed with the cyclic carbonate at an appropriate ratio, an electrolyte solution having a high electric conductivity may be prepared and thus may be more preferably used.

Also, examples of ether among the examples of the organic solvent may include one or a mixture of at least two selected from the group consisting of dimethyl ether, diethyl ether, dipropyl ether, methylethyl ether, methyl propyl ether, and ethyl propyl ether, but embodiments are not limited thereto.

Also, examples of ester among the examples of the organic solvent may include one or a mixture of at least two selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone, but embodiments are not limited thereto.

The electrolyte solution for a lithium secondary battery according to an embodiment may further include an additive for forming a conventional solid electrolyte interface (SEI) layer within the scope of the objective of the present invention. Examples of the additive for forming an SEI layer that may be used in an embodiment may include vinylene carbonate, vinyl ethylene carbonate, fluoroethylene carbonate, cyclic sulfite, saturated sultone, unsaturated sultone, and non-cyclic sulfone, which may be used alone or as a mixture of at least two selected therefrom, but embodiments are not limited thereto.

Examples of the cyclic sulfite may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethylpropylene sulfite, 4,6-diethylpropylene sulfite, and 1,3-butylene glycol sulfite. Examples of the saturated sultone may include 1,3-propane sultone and 1,4-butane sultone. Examples of the unsaturated sultone may include ethene sultone, 1,3-propenesultone, 1,4-butene sultone, and 1-methyl-1,3-propene sultone. Examples of the non-cyclic sulfone may include divinyl sulfone, dimethyl sulfone, diethyl sulfone, and methylvinyl sulfone.

The additive for forming an SEI layer may be included at an appropriate amount according to the type or, for example, may be included at an amount in a range of 0.01 parts to 10 parts by weight based on 100 parts by weight of the electrolyte solution.

According to another embodiment, provided is a lithium secondary battery including the electrolyte solution.

The lithium secondary battery is prepared by injecting the electrolyte solution prepared according to an embodiment to an electrode assembly including a positive electrode, a negative electrode, and a separator disposed between the positive electrode and the negative electrode. Also, the positive electrode and the negative electrode may each be prepared by, first, mixing an active material, a binder, and a conducting agent with a solvent to prepare a slurry, and then applying, drying, and pressing the slurry on a current collector such as aluminum.

The positive electrode active material may be, preferably, a lithium-containing transition metal oxide, which may be, for example, one or a mixture of at least two selected from the group consisting of $Li_xCoO_2$ (where, $0.5<x<1.3$), $Li_xNiO_2$ (where, $0.5<x<1.3$), $Li_xMnO_2$ (where, $0.5<x<1.3$), $Li_xMn_2O_4$ (where, $0.5<x<1.3$), $Li_x(Ni_aCo_bMn_c)O_2$ (where, $0.5<x<1.3$, $0<a<1$, $0<b<1$, $0<c<1$, and $a+b+c=1$), $Li_xNi_{1-y}Co_yO_2$ (where, $0.5<x<1.3$ and $0<y<1$), $Li_xCo_{1-y}Mn_yO_2$ (where, $0.5<x<1.3$ and $0<y<1$), $Li_xNi_{1-y}Mn_yO_2$ (where, $0.5<x<1.3$ and $0<y<1$), $Li_x(Ni_aCo_bMn_c)O_4$ (where, $0.5<x<1.3$, $0<a<2$, $0<b<2$, $0<c<2$, and $a+b+c=2$), $Li_xMn_{2-z}Ni_zO_4$ (where, $0.5<x<1.3$ and $0<z<2$), $Li_xMn_{2-z}Co_zO_4$ (where, $0.5<x<1.3$ and $0<z<2$), $Li_xCoPO_4$ (where, $0.5<x<1.3$), and $Li_xFePO_4$ (where, $0.5<x<1.3$). The lithium-containing transition metal oxide may be coated with a metal, such as aluminum (Al), or a metal oxide. Also, a sulfide, a selenide, and a halide may be used in addition to the lithium-containing transition metal oxide.

Examples of the negative active material may include a carbonaceous material, lithium metal, silicon, or tin from which lithium ions may generally intercalated and deintercalated, and a metal oxide such as $TiO_2$ or $SnO_2$, which has a potential with respect to lithium that is less than 2 V, may be used. Preferably, a carbonaceous material may be used, and low-crystalline carbon and high-crystalline carbon may both be used as the carbonaceous material. Examples of the low-crystalline carbon may include soft carbon and hard carbon, and examples of the high-crystalline carbon may include natural graphite, artificial graphite, Kish graphite, pyrolytic carbon, mesophase pitch-based carbon fibers, meso-carbon microbeads, mesophase pitches, and high-temperature calcined carbon such as petroleum or coal tar pitch-derived coke.

The binder attaches the active material to the conducting agent and fixes the active material on the current collector, and examples of the binder may include binders generally used in a lithium ion secondary battery such as PVdF, polypropylene, carboxymethyl cellulose, polyvinylpyrrolidone, tetrafluoroethylene, polyethylene, polyvinyl alcohol, and styrene butadiene rubber.

Examples of the conducting agent may include artificial graphite, natural graphite, acetylene black, Ketjen black, channel black, lamp black, thermal black, conducting fibers such as carbon fibers or metal fibers, a conducting metal oxide such as titanium oxide, and metal powders of aluminum or nickel.

Also, examples of the separator may include a single olefin such as polyethylene (PE) or polypropylene (PP) or an olefin complex, polyamide (PA), polyacrylonitrile (PAN), polyethylene oxide (PEO), polypropylene oxide (PPO), polyethylene glycoldiacrylate (PEGA), polytetrafluoroethylene (PTFE), polyvinylidene fluoride (PVdF), and polyvinylchloride (PVC).

Although a shape of the lithium secondary battery according to another embodiment is not limited, examples of the shape may include a cylinder using a can, a box, a pouch, or a coin.

Hereinafter, embodiments will be described in detail with reference to the following examples.

Preparation of Electrolyte Solution

Example 1

EC and EMC were mixed at a weight ratio of 3:7 to prepare an organic solvent. Next, $LiPF_6$, as a lithium salt, was dissolved in the organic solvent to prepare a $LiPF_6$ mixture solution having a lithium salt concentration of 1 M. Then, tetraethylammonium cyanide was added to the mixture solution at an amount of 0.1 parts by weight based on the 100 parts by weight of the mixture solution, and thus an electrolyte solution was prepared.

Example 2

An electrolyte solution was prepared in the same manner as in Example 1, except that tetraethylammonium cyanide was added at an amount of 0.25 parts by weight instead of 0.1 parts by weight based on 100 parts by weight of the mixture solution.

Comparative Example 1

An electrolyte solution was prepared in the same manner as in Example 1, except that tetraethylammonium cyanide was not added.

Comparative Example 2

An electrolyte solution was prepared in the same manner as in Example 1, except that 0.25 parts by weight of succinonitrile instead of 0.1 parts by weight of tetraethylammonium cyanide was added.

<Preparation of Battery>

$LiNi_{0.5}Co_{0.2}Mn_{0.3}O_2$ as a positive active material PVdF as a binder, and carbon black as a conducting agent were mixed at a weight ratio of 91.5:4.4:4.1 to prepare a mixture, and the mixture was dispersed in N-methyl-2-pyrolidone to prepare a positive electrode slurry. Then, the slurry was applied on an aluminum current collector having a thickness of 15 μm, and the current collector was dried and roll-pressed to prepare a positive electrode.

Also, artificial graphite as a negative active material, styrene butadiene rubber as a binder, and carboxymethyl cellulose as a viscosity enhancer were mixed at a weight ratio of 96:2:2 to prepare a mixture, and the mixture was dispersed in water to prepare a negative electrode slurry. The negative electrode slurry was applied on a copper current collector having a thickness of 10 μm, and the current collector was dried and roll-pressed to prepare a negative electrode.

Subsequently, a porous polyethylene layer (available from Tonen) as a separator was used together with the positive electrode and the negative electrode, and the electrolyte solution was injected thereto, thereby completing the manufacture of a coin cell.

<Evaluation Method>

(1) Light Absorbance Measurement

The negative electrodes having the same area with a diameter of 16 mm were left in each of the electrolyte solutions prepared in Examples 1 and 2 and Comparative Examples 1 and 2 at 45° C. for 24 hours, and then absorbances of the electrolyte solutions were measured by using an ultraviolet-visible (UV-Vis) spectrometer (Agilent 8453).

The absorbances at 800 nm, which quantitatively show absorbance peaks of $Cu^{2+}$, are shown in Table 1, and UV-Vis curves of Examples 1 and 2 and Comparative Examples 1 and 2 are shown in FIG. 1. A high absorbance represents a large amount of dissolution of copper ions in the electrolyte solution.

TABLE 1

|  | Absorbance (800 nm) |
| --- | --- |
| Example 1 | −0.009 |
| Example 2 | −0.009 |
| Comparative Example 1 | 0.189 |
| Comparative Example 2 | 0.137 |

Referring to Table 1, it may be known that copper dissolution was effectively suppressed when the electrolyte solutions prepared in Examples 1 and 2 according to an embodiment were used, compared to that of Comparative Example 1, which does not include an additive. Particularly, even when tetraethylammonium cyanide, which is a solid salt additive, was used at a trace amount (0.1 parts by weight and 0.25 parts by weight), copper dissolution was effectively suppressed, and thus the solid salt additive is preferable. On the other hand, in a case of Comparative Example 2, to which succinonitrile was added at an amount of 0.25 parts by weight, it may be known that the absorbance decreased as compared to that of Comparative Example 1, but copper dissolution was not fundamentally prevented.

(2) Cell Formation

The coin cells prepared by using the electrolyte solutions of Example 1 and Comparative Example 2 were left at a constant temperature of 25° C. for 12 hours, charged under conditions including a constant current of 0.1 C until a voltage reached 4.3 V and a constant voltage having a terminating current of 0.05 C, and discharged under conditions including a constant current of 0.1 C until a voltage reached 3.0 V by using a lithium secondary battery charger/discharger (TOSCAT-3600, available from Toyo-System Co., LTD), thereby completing a cell formation process.

(3) Charge/Discharge Efficiency and High-Temperature Lifespan Characteristic (%)

The cell that completed the formation process above was charged under conditions including a constant current of 0.5 C until a voltage reached 4.3 V and a constant voltage having terminating current of 0.05 C, and discharged under conditions including a constant current of 0.5 C until a voltage reached 3.0 V. Then, a charge capacity (CH, unit: mAh/g) and a discharge capacity (DCH, unit: mAh/g) of the first cycle were measured, and the charge/discharge test under these conditions was repeated 50 times at 45° C. A charge/discharge efficiency (EFF) and a capacity retention were calculated according to the following equations, and the results are shown in Table 2.

Charge/discharge efficiency (%)=Discharge capacity/charge capacity

Capacity retention at $50^{th}$ cycle [%]=(Discharge capacity at $50^{th}$ cycle/discharge capacity at $1^{st}$ cycle)×100

TABLE 2

| System | 1st cycle | | | 50th cycle | | | Capacity retention (%) |
|---|---|---|---|---|---|---|---|
| | CH | DCH | EFF (%) | CH | DCH | EFF (%) | |
| Example 1 | 148.4 | 144.8 | 97.6 | 132 | 131.6 | 99.7 | 90.9 |
| Comparative Example 2 | 140.7 | 136 | 96.7 | 104.7 | 103.2 | 98.6 | 75.9 |

Referring to Table 2, when the coin cell including the electrolyte solution prepared in Example 1 was used, it may be confirmed that discharge capacity, charge/discharge efficiency, and cycle characteristics under a high-temperature condition (45° C.) were improved as compared to those of the coin cell prepared according to Comparative Example 2.

While one or more embodiments have been described with reference to the figures, it will be understood by those of ordinary skill in the art that various changes in form and details may be made therein without departing from the spirit and scope of the disclosure as defined by the following claims.

The invention claimed is:

1. An electrolyte solution for a lithium secondary battery, the electrolyte solution comprising:
 a lithium salt;
 an organic solvent; and
 a solid salt that is represented by Formula 1 and has an ammonium-based cation and a cyanide anion (CN$^-$):

[Formula 1]

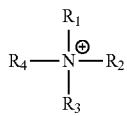

wherein, in Formula 1, $R_1$ to $R_4$ are each independently hydrogen, halogen, or a C1-C8 alkyl group, and at least one of $R_1$ to $R_4$ is halogen or a C1-C8 alkyl group.

2. The electrolyte solution of claim 1, wherein the solid salt is at least one selected from the group consisting of tetramethylammonium cyanide, tetraethylammonium cyanide, tetrapropylammonium cyanide, tetrabutylammonium cyanide, tetrahexylammonium cyanide, tetraheptylammonium cyanide, ethyltrimethylammonium cyanide, triethylmethylammonium cyanide, butyltrimethylammonium cyanide, diethyldimethylammonium cyanide, and dibutyldimethylammonium cyanide.

3. The electrolyte solution of claim 1, wherein an amount of the solid salt is in a range of 0.01 part to 5.0 parts by weight based on 100 parts by weight as a total weight of the lithium salt and the organic solvent.

4. The electrolyte solution of claim 1, wherein an anion of the lithium salt is at least one selected from the group consisting of F$^-$, Cl$^-$, Br$^-$, I$^-$, NO$_3^-$, N(CN)$_2^-$, BF$_4^-$, ClO$_4^-$, PF$_6^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, CF$_3$CF$_2$SO$_3^-$, (CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, (SF$_5$)$_3$C$^-$, (CF$_3$SO$_2$)$_3$C$^-$, CF$_3$(CF$_2$)$_7$SO$_3^-$, CF$_3$CO$_2^-$, CH$_3$CO$_2^-$, SCN$^-$, and (CF$_3$CF$_2$SO$_2$)$_2$N$^-$.

5. The electrolyte solution of claim 1, wherein the organic solvent is at least one selected from the group consisting of ether, ester, amide, linear carbonate, and cyclic carbonate.

6. The electrolyte solution of claim 1, further comprising at least one selected from vinylene carbonate, vinyl ethylene carbonate, fluoroethylene carbonate, cyclic sulfite, saturated sultone, unsaturated sultone, and non-cyclic sulfone.

7. A lithium secondary battery comprising the electrolyte solution of claim 1.

* * * * *